United States Patent [19]
Chieng

[11] Patent Number: 5,350,068
[45] Date of Patent: Sep. 27, 1994

[54] ROTARY 3½" DISKETTE STORAGE BOX

[76] Inventor: Walter Chieng, 1F, No. 12, Alley 18, Lane 277, Sec. 6 Chung Shan N. Rd., Taipei, Taiwan

[21] Appl. No.: 119,725

[22] Filed: Sep. 10, 1993

[51] Int. Cl.[5] .............................................. B65D 85/57
[52] U.S. Cl. ..................................... 206/444; 312/9.51
[58] Field of Search ........................ 206/303, 307–313, 206/387, 425, 444, 455, 456; 312/9.46, 9.51

[56] References Cited

U.S. PATENT DOCUMENTS

| | | | |
|---|---|---|---|
| 1,259,602 | 3/1918 | Clark | 312/9.51 |
| 2,182,460 | 12/1939 | Werner | 312/9.51 |
| 4,498,583 | 2/1985 | Long et al. | 206/444 |
| 4,708,408 | 11/1987 | Kennon | 312/9.46 |
| 4,802,587 | 2/1989 | Armijo | 312/9.46 |
| 4,826,261 | 5/1989 | Nademlejnsky | 312/9.46 |
| 4,844,260 | 7/1989 | Jaw | 206/444 |
| 4,871,066 | 10/1989 | Lawall | 206/444 |

FOREIGN PATENT DOCUMENTS

| | | | |
|---|---|---|---|
| 8911719 | 11/1989 | PCT Int'l Appl. | 206/444 |
| 2167391 | 5/1986 | United Kingdom | 206/444 |

Primary Examiner—Jimmy G. Foster
Attorney, Agent, or Firm—Notaro & Michalos

[57] ABSTRACT

A rotary 3½" diskette storage box includes a diskette case with a plurality of U-shaped plates together forming a plurality of stepped spaces each for receiving a diskette. The spaces are offset in an upward and rearward direction along the diskette case, the diskette case having a rear end and a bottom. A cover covers the stepped spaces and the cover has a rear end. A hinge is connected between the rear ends of the case and cover for pivotally connecting the cover to the case for exposing and covering the stepped spaces. A pair of spaced apart hooks extending downwardly from the bottom and engages a hole in a base for rotatably connecting the base to case. The base has a circumference with a plurality of convex spot-like projections spaced there around and engageable against the bottom of the case for facilitating rotation of the case on the base.

12 Claims, 3 Drawing Sheets

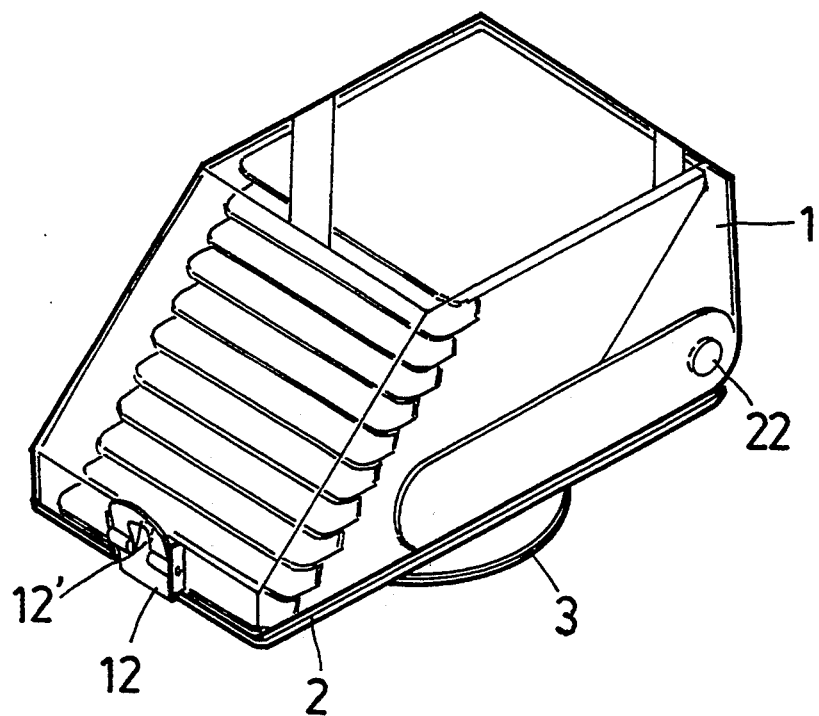
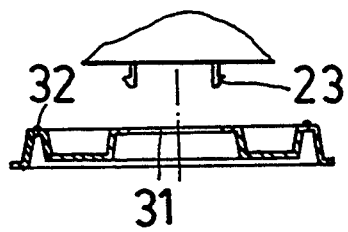
FIG. 5
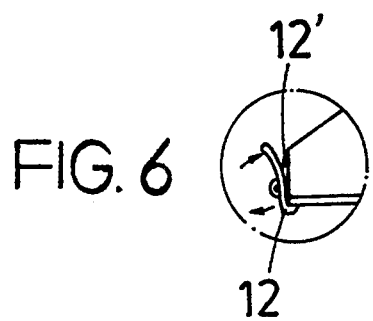
FIG. 6

ROTARY 3½" DISKETTE STORAGE BOX

BACKGROUND OF THE INVENTION

This invention relates to a 3½" diskette storage box which has a plurality of stepped spaces formed therein, each for storing a diskette which can be taken out or stored easily and conveniently.

Laptop computers have been used widely in recent years. This type of computer can be used to process various types of work in the office, outdoors, in a car or any other appropriate place.

Accordingly, laptop computers possess many advantageous features, such as small mass, excellent function etc. and can be equipped with other facility easily. This kind of computer is used with 3½" diskettes, but there is no suitable diskette storage boxes for storing 3½" diskettes, at present. The conventional diskette storage boxes always have similar structures which are very inconvenient for taking out or depositing diskettes.

SUMMARY OF THE INVENTION

It is therefore the main object of this invention to provide a rotary 3½" diskette storage box which is composed of an upper cover, a diskette case and a rotary bas. Inside, the diskette case has a plurality of stepped spaces which are constituted by a plurality of "U" shape plates, the upper cover being hinged at the rear of the diskette case and opened freely. The bottom of the diskette case is connected to the rotary base and can be rotated, meanwhile allowing users to take out or store disks easily.

BRIEF DESCRIPTION OF THE DRAWINGS

To promoting an understanding of the principles of this invention, reference will be made to the embodiment illustrated in the drawings where:

FIG. 1 is a perspective view showing the outline of this invention.

FIG. 5 is an exploded view showing the relationship between the hooks and the opening in the base before the case and base are engaged to each other.

FIG. 6 is a view taken in the area of the phantom circle in FIG. 2, showing the retaining plate of the invention.

DETAILED DESCRIPTION OF THE PREFERRED EMBODIMENT

Figure 2:
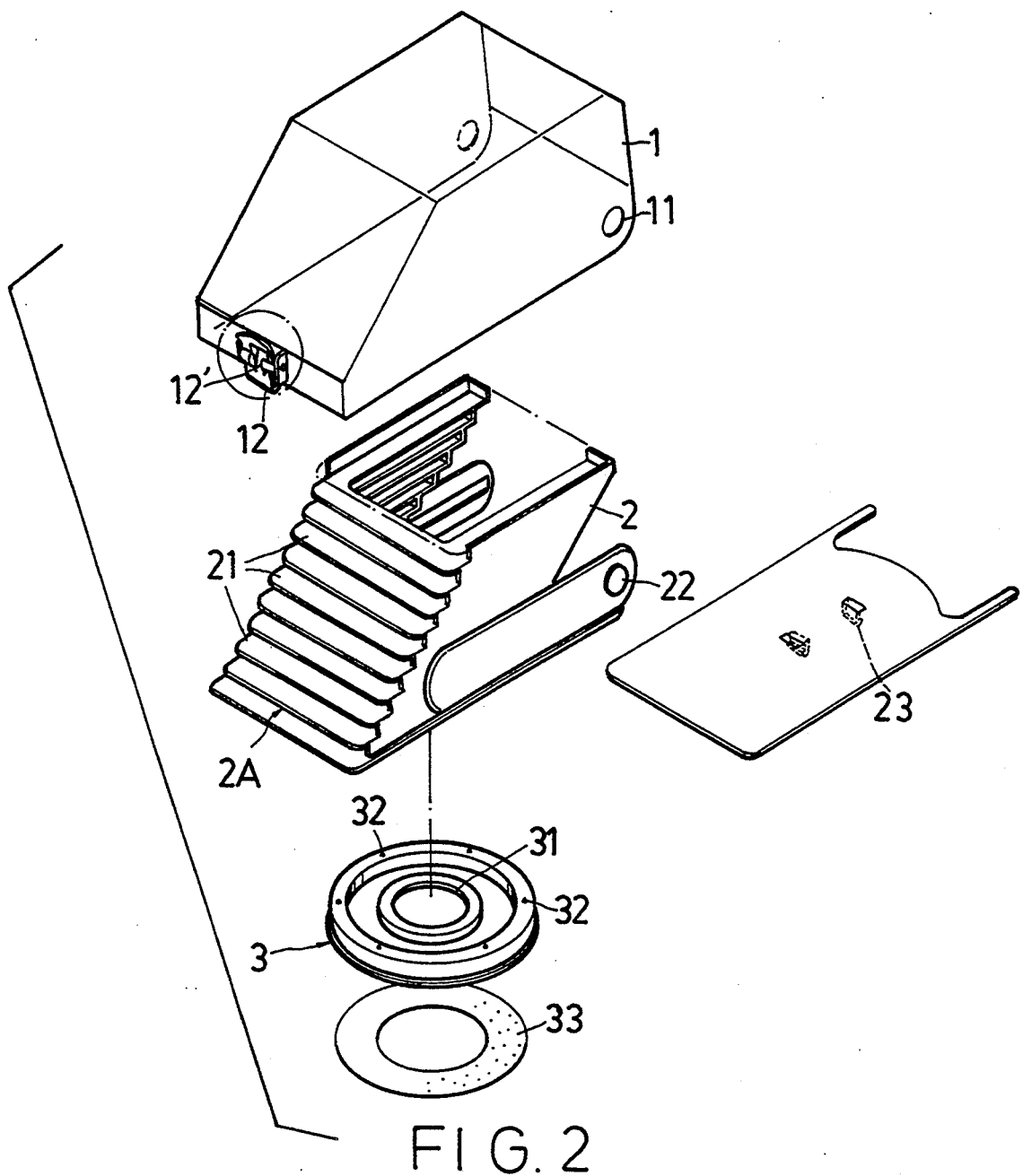
FIG. 2 is an exploded view of this invention.

Referring to FIG. 1 and FIG. 2, this invention composed of an upper cover (1), a diskette case (2) and a rotary base (3), the diskette case (2) having a plurality of stepped spaces (2A) which are consitituted by plurality of "U" shape plates (21). At the rear of the diskette case (2) there is a hinge (22) and the bottom of the case 2 has a pair of elastic converted hooks (23).

The upper cover (1) is made of transparent material and has a slanted front wall so as to match the stepped spaces (2A) of the diskette case (2). At the rear of the upper cover (1) it has a hole (11) in which the hinge (22) can be inserted so as to allow the upper cover (1) to be opened around the hinge (22). At the front of the upper cover (1) there is a retaining plate (12) on which an elastic piece (12') is fixed so as to retain the upper cover (1) (FIG. 6).

At the center of the rotary base (3), a fixing hole (31) is provided to receive hooks 23 (see FIG. 5). The diskette case (2) and the rotary base (3) can thus be connected. At the circumference of the rotary base (3) there are a plurality of convex spot-like projections (32) and the bottom has a non-slip disk (33) used for preventing the rotary base (3) from sliding.

Figure 3:
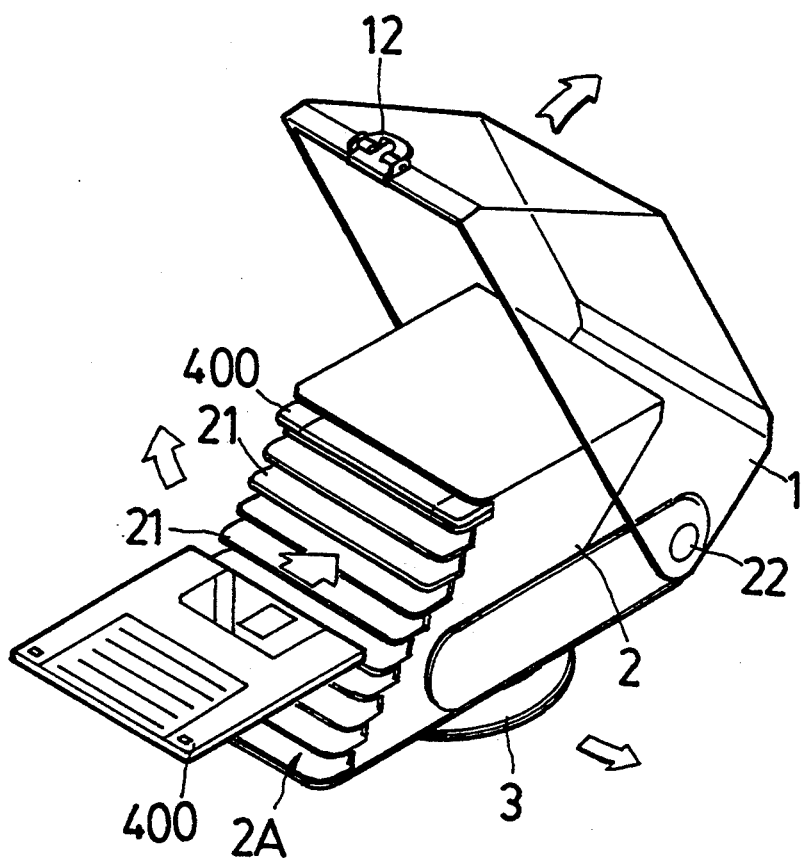
FIG. 3 is an illustrating view showing the operating status of this invention.
Figures 4A, 4B:
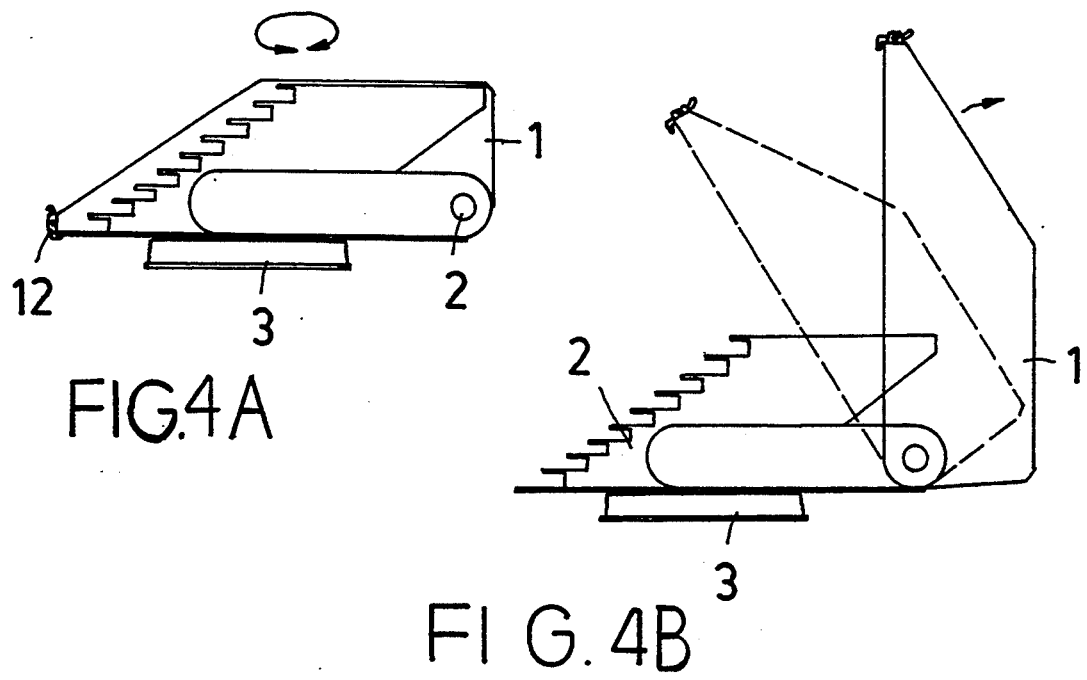
FIG. 4A is a side view of this invention with the cover closed.
FIG. 4B is a side view with the cover open.

Referring to FIG. 3, 4B and FIG. 4A, the 3½" disks (400) are stored in the diskette case (2) in step-wise fashion and case (2) can be rotated on the rotary base (3) so that the users can take out or store disks conveniently.

It is understand by those skilled in the art that the foregoing description is a preferred embodiment of the disclosed device and that various changes and modifications may be made in the invention without departing from the spirit and scope thereof.

What is claimed is:

1. A rotary 3½" diskette storage box comprising:
    a diskette case including a plurality of U-shaped plates together forming a plurality of stepped spaces each for receiving a diskette, said spaces being offset in an upward and rearward direction along the diskette case, the diskette case having a rear end and a bottom;
    a cover for covering the stepped spaces, the cover having a rear end;
    a hinge connected between the rear ends of the case and cover for pivotally connecting the cover to the case for exposing and covering the stepped spaces;
    a pair of spaced apart hooks extending downwardly from the bottom; and
    a base having a fixing hole therein, engagable by said hooks for rotatably connecting said base to said case, said base having a circumference with a plurality of convex spot-like projections spaced there around and engageable against the bottom of the case for facilitating rotation of the case on the base.

2. A box according to claim 1, wherein the hooks are elastic.

3. A box according to claim 2, including a non-slip disk under said base for preventing slipping of said base.

4. A box according to claim 3, wherein said cover is made of transparent material and has a slanted front wall for covering said stepped spaces when said cover is closed on said case.

5. A box according to claim 4, wherein said hinge comprises a pair of side pieces extending along opposite sides of said diskette case and rearwardly to the rear end of said case, said cover being pivotally connected to said side pieces.

6. A box according to claim 5, wherein said cover includes opposite sides with an opening in each opposite side near the rear end of said case, said side pieces including projections engaged into the respective openings of said cover for pivotal movement of said cover and said case.

7. A box according to claim 6, including an elastic retaining plate connected to said cover and engagable with said case for holding said cover in a closed position over said case.

8. A box according to claim 1, including a non-slip disk under said base for preventing slipping of said base.

9. A box according to claim 1, wherein said cover is made of transparent material and has a slanted front wall for covering said stepped spaces when said cover is closed on said case.

10. A box according to claim 1, wherein said hinge comprises a pair of side pieces extending along opposite sides of said diskette case and rearwardly to the rear end of said case, said cover being pivotally connected to said side pieces.

11. A box according to claim 1, wherein said cover includes opposite sides with an opening in each opposite side near the rear end of said case, said side pieces including projections engaged into the respective openings of said cover for pivotal movement of said cover and said case.

12. A box according to claim 1, including an elastic retaining plate connected to said cover and engagable with said case for holding said cover in a closed position over said case.

* * * * *